(12) United States Patent
Zhang

(10) Patent No.: US 11,225,349 B2
(45) Date of Patent: Jan. 18, 2022

(54) RECYCLING DEVICE

(71) Applicant: Shenzhen Jingjiang Yunchuang Technology Co., Ltd., Shenzhen (CN)

(72) Inventor: Xue-Qin Zhang, Shenzhen (CN)

(73) Assignee: Shenzhen Jingjiang Yunchuang Technology Co., Ltd., Shenzhen (CN)

( * ) Notice: Subject to any disclaimer, the term of this patent is extended or adjusted under 35 U.S.C. 154(b) by 306 days.

(21) Appl. No.: 16/542,424

(22) Filed: Aug. 16, 2019

(65) Prior Publication Data

US 2020/0407094 A1   Dec. 31, 2020

(51) Int. Cl.
| | | |
|---|---|---|
| *B65B 57/10* | (2006.01) | |
| *B65F 1/16* | (2006.01) | |
| *B65B 5/06* | (2006.01) | |

(52) U.S. Cl.
CPC ............... *B65B 57/10* (2013.01); *B65B 5/06* (2013.01); *B65F 1/1638* (2013.01); *B65F 2210/138* (2013.01); *B65F 2210/184* (2013.01)

(58) Field of Classification Search
CPC .......... B65F 2210/168; B65F 2210/152; B65F 2210/184; B65F 2210/138; B65F 1/1638; B65B 57/10; B65B 5/06; B07C 2501/0054; G06Q 10/30
USPC ............................................................. 53/52
See application file for complete search history.

(56) References Cited

U.S. PATENT DOCUMENTS

| | | | | |
|---|---|---|---|---|
| 9,888,159 B2* | 2/2018 | Loh | ..................... | H04N 7/183 |
| 9,904,911 B2* | 2/2018 | Bowles | ..................... | G07F 7/06 |
| 10,157,427 B2* | 12/2018 | Bowles | ..................... | G07F 7/06 |
| 10,185,935 B2* | 1/2019 | Rodoni | ..................... | B65F 1/006 |
| 10,406,564 B1* | 9/2019 | Al-Ateeq | ............... | B65F 1/1426 |
| 10,977,700 B2* | 4/2021 | Bordeleau | ............... | G06Q 10/30 |
| 11,046,562 B2* | 6/2021 | High | ..................... | A47F 13/00 |
| 2003/0034391 A1* | 2/2003 | Wagner | ..................... | B65F 1/004 |
| | | | | 235/385 |
| 2004/0133484 A1* | 7/2004 | Kreiner | ................... | G06Q 10/30 |
| | | | | 705/28 |
| 2009/0216593 A1* | 8/2009 | Gonen | ..................... | G06Q 30/02 |
| | | | | 705/14.1 |
| 2010/0116299 A1* | 5/2010 | Hicks | ..................... | B08B 9/30 |
| | | | | 134/115 R |
| 2012/0029985 A1* | 2/2012 | Wilson | ..................... | G06Q 10/30 |
| | | | | 705/14.11 |
| 2013/0055908 A1* | 3/2013 | Ismail | ..................... | B65F 1/1426 |
| | | | | 100/35 |

(Continued)

FOREIGN PATENT DOCUMENTS

| | | | |
|---|---|---|---|
| CN | 103738640 A | | 4/2014 |
| CN | 107470324 A | | 12/2017 |
| CN | 109606991 A | | 4/2019 |

*Primary Examiner* — Dariush Seif
(74) *Attorney, Agent, or Firm* — ScienBiziP, P.C.

(57) ABSTRACT

A recycling device includes a main body, an input module, an identification module, a detection module, a packaging module, and a storage module. The input module includes at least one input port for depositing a waste product of one type. The identification module identifies the deposited waste product and determines whether the type of the deposited waste product matches the corresponding input port. The detection module detects a purity of the deposited waste product when the type of the deposited waste product matches the corresponding input port. The packaging module packages the deposited waste product when the purity of the deposited waste product is qualified. The storage module stores the deposited waste product.

11 Claims, 8 Drawing Sheets

(56) References Cited

U.S. PATENT DOCUMENTS

| | | | |
|---|---|---|---|
| 2013/0226679 A1* | 8/2013 | Bowles | G06Q 30/0237 |
| | | | 705/14.11 |
| 2014/0379588 A1* | 12/2014 | Gates | G06Q 10/30 |
| | | | 705/308 |
| 2015/0144012 A1* | 5/2015 | Frybarger | B30B 15/26 |
| | | | 100/102 |
| 2015/0350610 A1* | 12/2015 | Loh | H04N 1/00278 |
| | | | 348/143 |
| 2015/0371187 A1* | 12/2015 | Irwin | G07F 9/002 |
| | | | 705/72 |
| 2016/0021287 A1* | 1/2016 | Loh | B65F 1/02 |
| | | | 348/143 |
| 2016/0092849 A1* | 3/2016 | Cirannek | H04N 5/225 |
| | | | 705/26.4 |
| 2016/0167056 A1* | 6/2016 | Squartino | B02C 18/0084 |
| | | | 241/15 |
| 2016/0328684 A1* | 11/2016 | Bowles | G06Q 99/00 |
| 2017/0154287 A1* | 6/2017 | Kalinowski | G06Q 10/30 |
| 2017/0174439 A1* | 6/2017 | Ripley | B29B 17/02 |
| 2018/0016096 A1* | 1/2018 | Krishnamurthy | B65F 1/14 |
| 2018/0039959 A1* | 2/2018 | Rodoni | B65F 1/1473 |
| 2018/0056336 A1* | 3/2018 | Castelli | B65F 1/004 |
| 2019/0131013 A1* | 5/2019 | Kelkar | G06Q 10/30 |
| 2019/0241298 A1* | 8/2019 | Brooks | B25J 9/1687 |
| 2019/0243316 A1* | 8/2019 | Yamine | G05B 13/027 |
| 2019/0322450 A1* | 10/2019 | O'Brien | B65F 1/1426 |
| 2019/0385384 A1* | 12/2019 | Romano | G06Q 10/08 |
| 2020/0010271 A1* | 1/2020 | Bourn | B65F 1/16 |
| 2020/0175883 A1* | 6/2020 | Stelmar Netto | G01N 29/4445 |
| 2020/0270056 A1* | 8/2020 | Ophardt | B65F 1/1638 |
| 2021/0214154 A1* | 7/2021 | ?Otysz | B65F 1/006 |

\* cited by examiner

RECYCLING DEVICE

FIELD

The subject matter herein generally relates to recycling devices for recycling and packaging waste products.

BACKGROUND

Some kinds of waste products can be recycled for reimbursement. However, the recyclable waste products may be thrown away if it is troublesome to recycle the waste products, which causes environmental damage.

BRIEF DESCRIPTION OF THE DRAWINGS

Implementations of the present disclosure will now be described, by way of embodiments, with reference to the attached figures.

DETAILED DESCRIPTION

Figure 1:
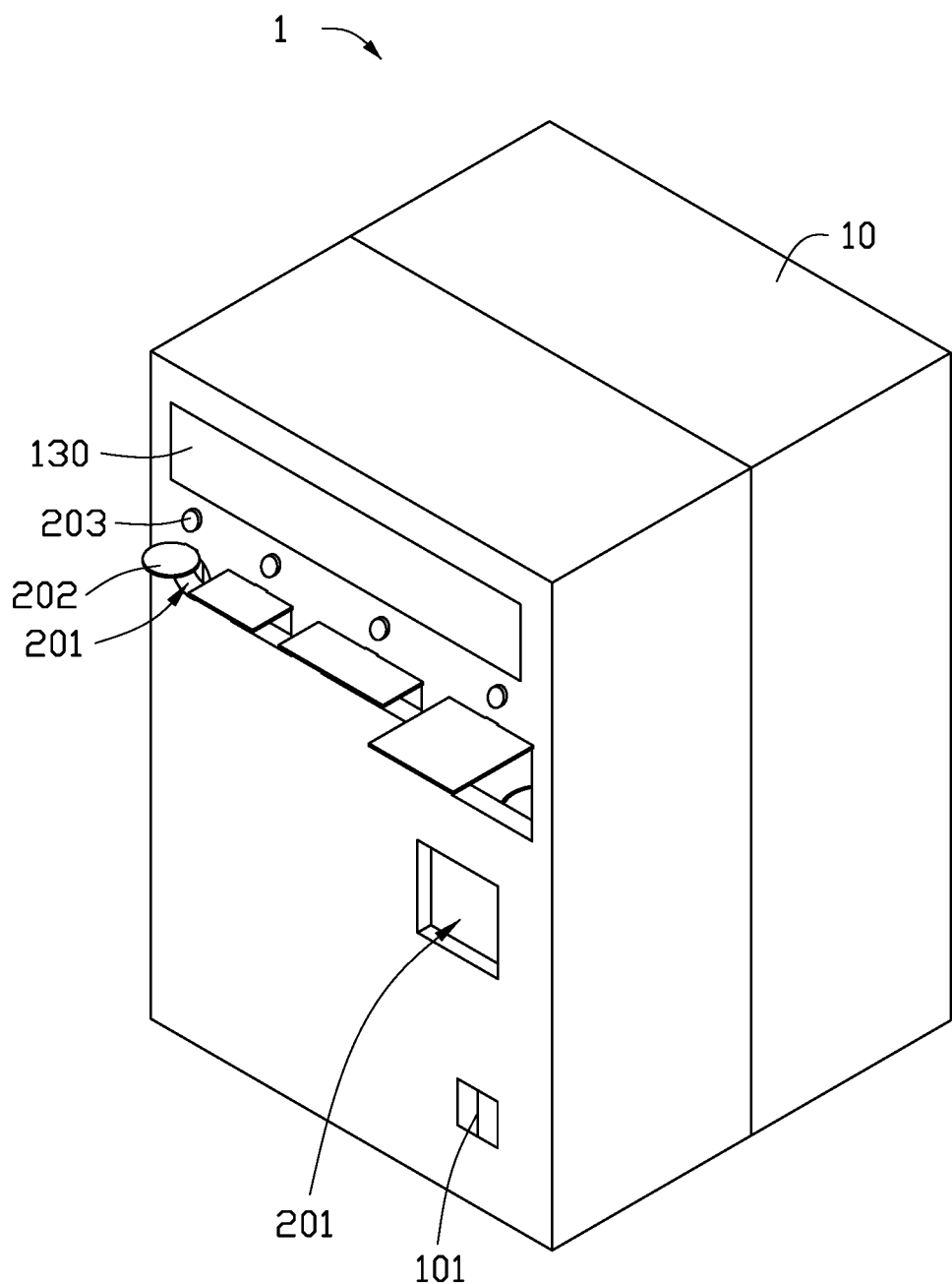
FIG. 1 is a schematic diagram of an embodiment of a recycling device.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 2:
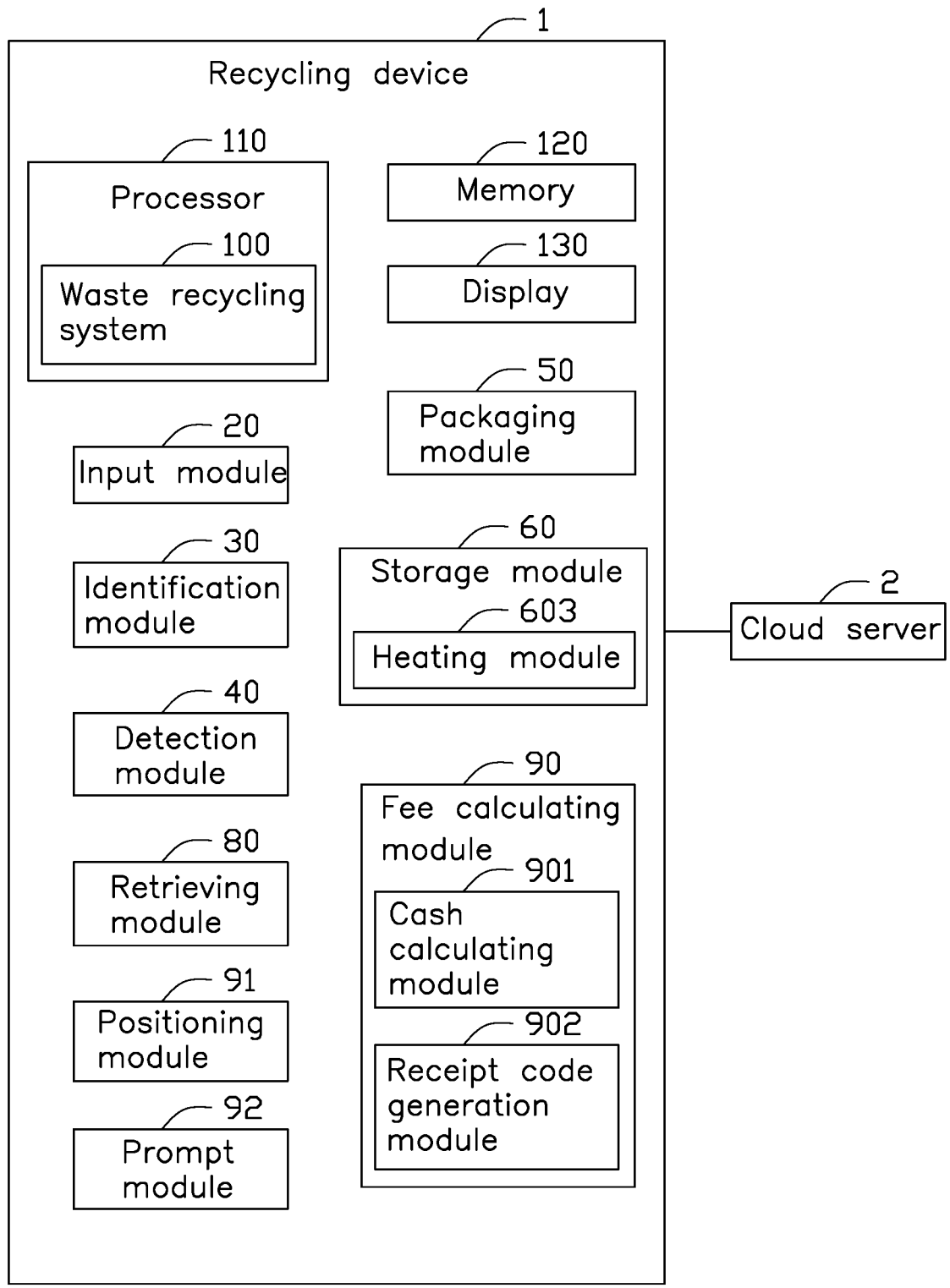
FIG. 2 is a block diagram of the recycling device in FIG. 1.

FIG. 1 shows a schematic diagram of an embodiment of a recycling device. FIG. 2 shows a block diagram of the recycling device 1 in FIG. 1. The recycling device 1 receives waste products discarded by a user and packages the waste products for storage.

Referring to FIGS. 1 and 2, the recycling device 1 includes, but is not limited to, a main body 10, an input module 20, an identification module 30, a detection module 40, a packaging module 50, and a storage module 60. The input module 20, the identification module 30, the detection module 40, the packaging module 50, and the storage module 60 are installed in the main body 10.

As shown in FIG. 2, the recycling device 1 is communicably coupled to a cloud server 2 and runs a waste recycling system 100. The recycling device 1 further includes a processor 110, a memory 120, and a display 130. The processor 110 may be a single chip microcomputer or a system on a chip for controlling the identification module 30, the detection module 40, the packaging module 50, and the storage module 60 to implement corresponding functions. The memory 120 stores recycling data of the recycling device 1. The recycling data includes at least a type of waste products that the recycling device 1 can receive, a recycling price of the waste products, and a weight of each type of waste product that has been received. The display 130 may be an LED display or an LCD display for displaying a current reimbursement price of the waste products.

Figure 3:
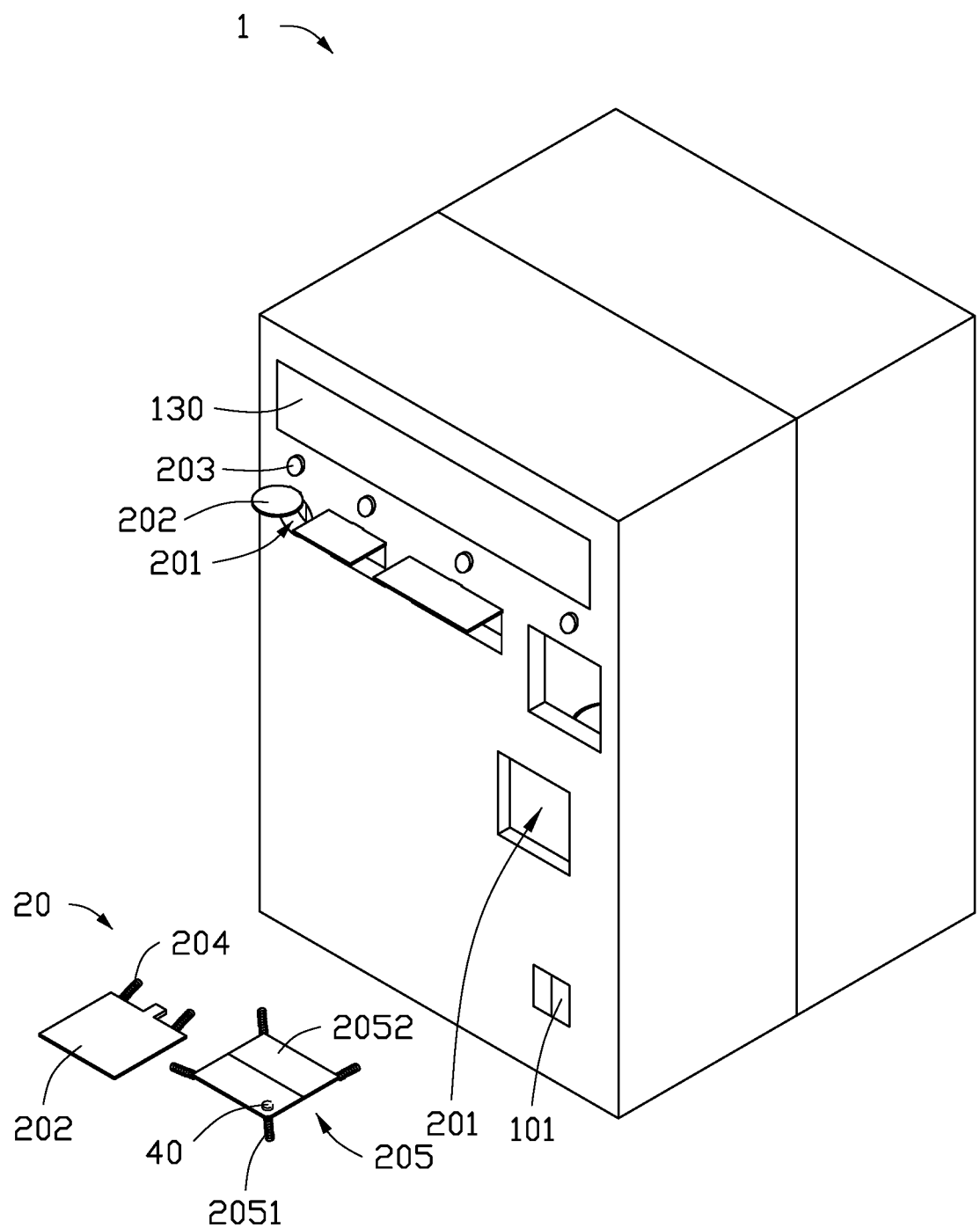
FIG. 3 is a partial exploded view of the recycling device in FIG. 1.

Referring to FIG. 1 and FIG. 3, the input module 20 includes at least one input port 201, a cover 202, a button 203, a spring device 204, and a carrying device 205. The input module 20 may include a plurality of input ports 201, and each input port 201 correspondingly receives one type of waste product. The types of waste products include at least paper, metal, plastic, and electronic products.

The input port 201 is defined on a front panel of the main body 10 for depositing the waste products, and a corresponding cover 202 is disposed at each input port 201. A corresponding button 203 is disposed above each input port 201 on the front panel of the main body 10. A corresponding spring device 204 is disposed at each cover 202 and controls the corresponding cover 202 to open and close. The carrying device 205 carries the waste products deposited through the input ports 201.

The button 203 corresponding to the type of waste product to be input is pressed to trigger the spring device 204 to control the cover 202 at the corresponding input port 201 to open. Then, the waste product can be deposited through the corresponding input port 201.

The identification module 30 is disposed at an inner wall position directly above each of the carrying devices 205 in the main body 10. In one embodiment, the identification module 30 includes at least an imaging device (not shown) for identifying the type of waste product by machine vision and deep learning. Specifically, a plurality of image features of each type of waste product is stored in the memory 120. The plurality of image features is generated by the recognition module 30 by deep learning.

When the waste product is carried on the carrying device 205, the imaging device captures an image of the waste product, and features of the captured image are compared to the image features in the memory 120. When the features of the captured image are the same or similar to at least one image feature in the memory 120, it is determined that the deposited waste product matches the type of waste product corresponding to the input port 201. If the features of the captured image are different or dissimilar to the image features in the memory 120, the imaging device determines that the deposited waste product does not match the type of waste product corresponding to the input port 201. At this time, the processor 110 controls the display 130 to display a prompt message to inform that the waste product has been deposited through the wrong input port 201.

In one embodiment, the detection module 40 is mounted on the carrying device 205 for detecting a purity of the deposited waste product. In one embodiment, the detection module 40 is an industrial endoscope or an X-ray fluoroscopy machine for detecting waste components and further determining the purity of the waste product according to the waste components. Specifically, the detection module 40 detects whether the purity of the deposited waste product is greater than or equal to a preset percentage, and determines that the waste product having a purity greater than or equal to the preset percentage is qualified. When the purity of the deposited waste product is less than the predetermined percentage, it is determined that the quality of the waste product is not qualified. For example, when the waste product is deposited through the input port 201 corresponding to paper, the detection module 40 detects the percentage of paper of a total composition of the deposited waste product. In one embodiment, the preset percentage is 60%. In other embodiments, the preset percentage may be set according to requirements.

In one embodiment, the carrying device 205 includes four electromagnetic springs 2051 and two carrying portions 2052. Each of the carrying portions 2052 is provided with two electromagnetic springs 2051. The electromagnetic springs 2051 are electrically coupled to the processor 110 for weighing the deposited waste product carried on the carrying portions 2052 by an electromagnetic weighing method. When the deposited waste product matches the corresponding input port 201 and is determined to be qualified, the processor 110 controls the electromagnetic springs 2051 to drive one end of the carrying portions 2052 to move downward, so that the deposited waste product falls into the packaging module 50.

Figure 4:
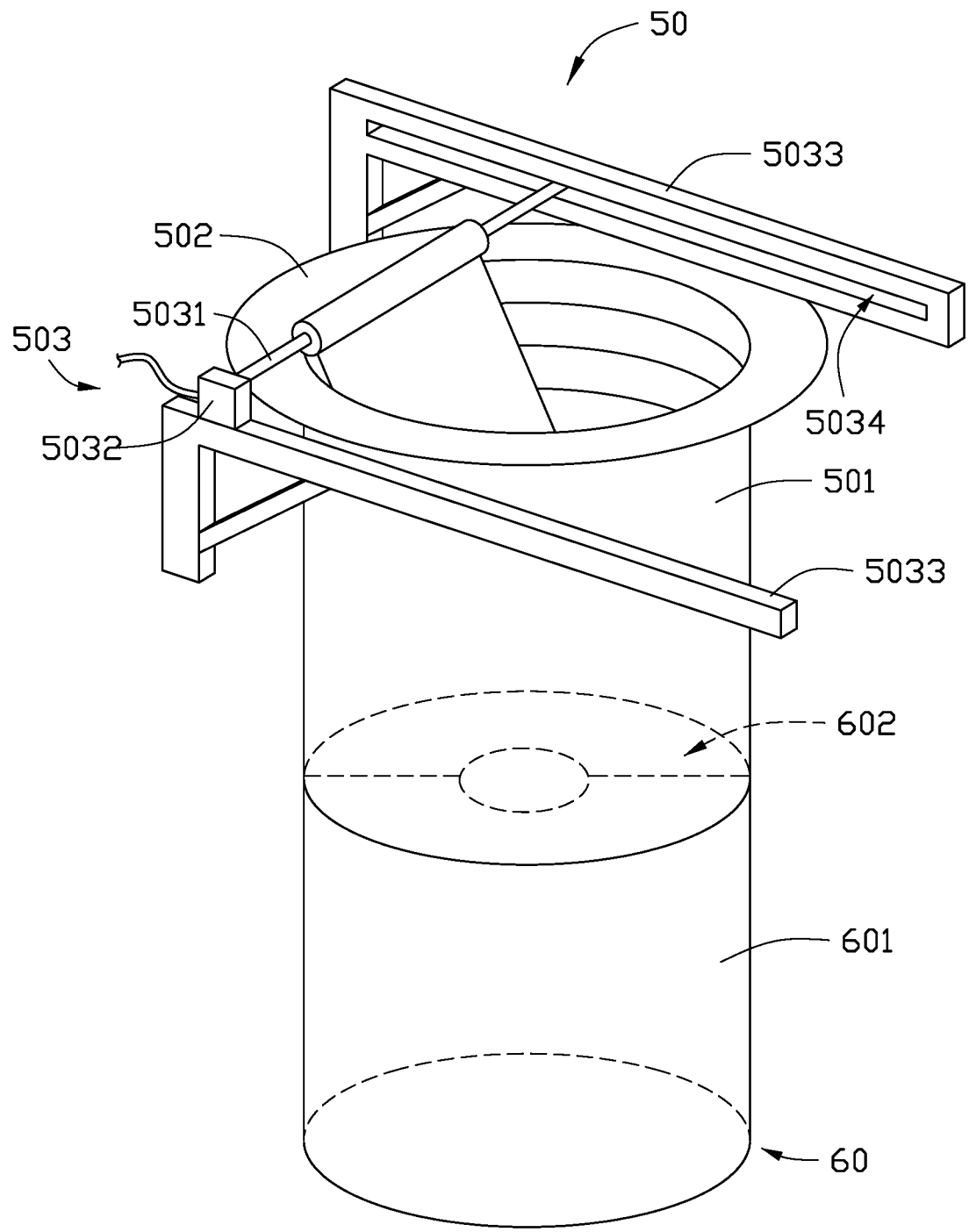
FIG. 4 is a schematic diagram of a packaging module and a storage module of the recycling device.

Referring to FIG. 4, the packaging module 50, in one embodiment, the packaging module 50 includes at least a first receiving chamber 501, a first packaging portion 502, and a second packaging portion 503. The first receiving chamber 501 receives the waste products input through the input port 201.

The first packaging portion 502 is mounted in the first receiving chamber 501 and is in contact with an upper end of the first receiving chamber 501. In one embodiment, the first receiving chamber 501 and the first packaging portion 502 are substantially hollow cylinders, and an outer diameter of the first packaging portion 502 is less than an inner diameter of the first receiving chamber 501, so that the first packaging portion 502 is received in the first receiving chamber 501.

The second packaging portion 503 includes a fixing portion 5031, a driving portion 5032, and two supporting portions 5033. In one embodiment, the two supporting portions 5033 are respectively disposed on opposite sidewalls of the main body 10, and the driving portion 5032 is a motor including a pulley. A first supporting portion 5033 defines a through slot 5034, and a second supporting portion 5033 is provided with the driving portion 5032. A first end of the fixing portion 5031 is mounted in the through slot 5034, and a second end of the fixing portion 5031 is detachably coupled to the driving portion 5032, so that the fixing portion 5031 is slidable along the two supporting portions 5033. A packaging material is wound around the fixing portion 5031. In one embodiment, the packaging material is a wrapper having an adhesive side. In other embodiments, the packaging material may be a plastic or rubber material suitable for packaging.

Figure 5:
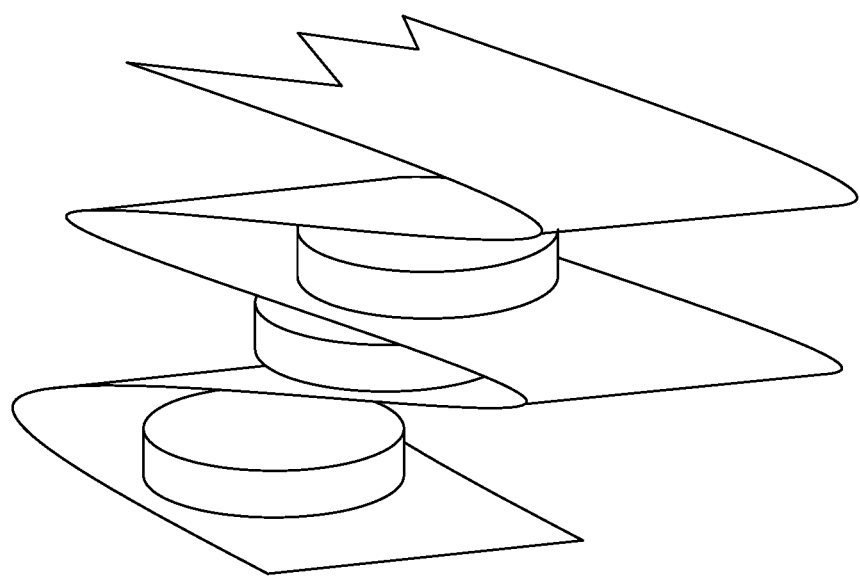
FIG. 5 is a schematic diagram showing packaged waste products.

When the deposited waste product falls into the first receiving chamber 501, the processor 110 controls the driving portion 5032 to drive the fixing portion 5031 to slide along the supporting portions 5033 to an opposite end of the supporting portions 5033, so that the adhesive side of the packaging material adheres to the waste product. The fixing portion 5031 is driven to slide to the opposite end of the supporting portions 5033 each time a waste product is received in the first receiving chamber 501. Thus, when multiple waste products are received in the first receiving chamber 501, a packaging pattern as shown in FIG. 5 is formed.

As shown in FIG. 4, the storage module 60 includes a second receiving chamber 601 and a spring device 602. The second receiving chamber 601 is coupled to the first receiving chamber 501 and stores the packaged waste products.

Figure 6:
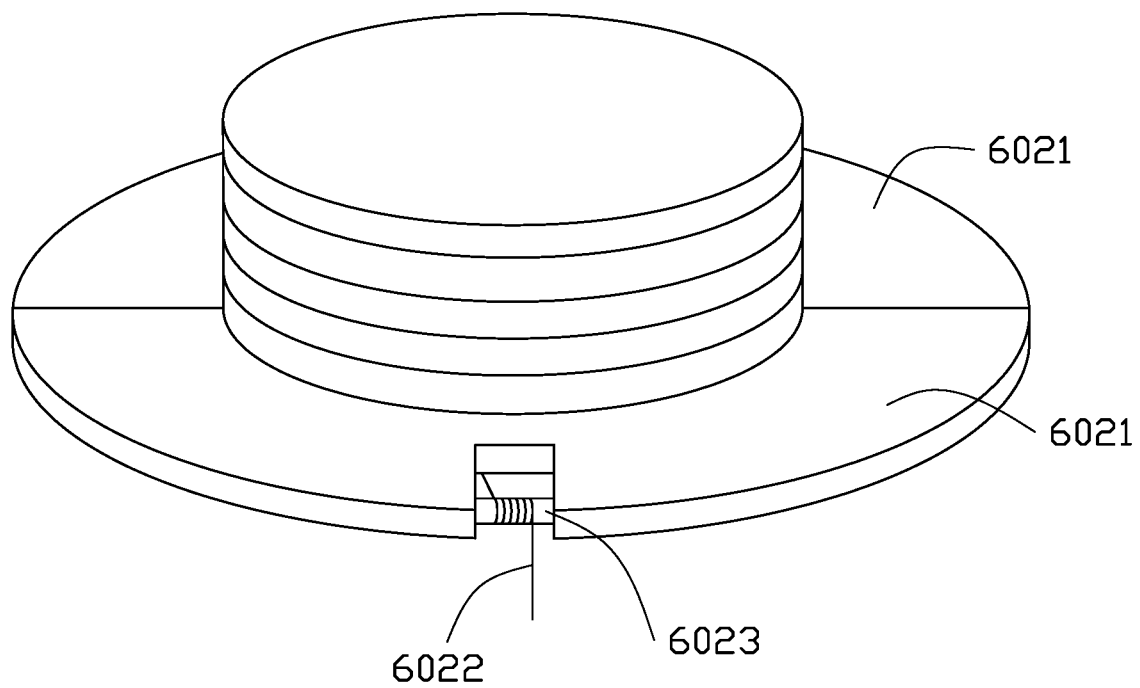
FIG. 6 is a schematic diagram of a spring device of the recycling device.

The spring device 602 is disposed at a joint between the second receiving chamber 601 and the first receiving chamber 501. Referring to FIG. 6, the spring device 602 includes two resilient panels 6021, two springs 6022, and two fixing rods 6023. The resilient panels 6021 carry the waste products in the first receiving chamber 501. Each of the resilient panels 6021 defines a notch (not labeled). Each fixing rod 6023 is disposed in the respective notch, and each spring 6022 is sleeved on the respective fixing rod 6023 for resetting a position of the resilient panel 6021. In one embodiment, the springs 6022 are torsion springs.

When a weight of the waste products on the resilient panels 6021 in the first receiving chamber 501 exceeds a preset load-bearing capacity, the two resilient panels 6021 are rotated downward, and the packaged waste products fall into the second receiving chamber 601. In one embodiment, the preset load-bearing capacity is two kilograms.

As shown in FIG. 2, the storage module 60 further includes a heating module 603 for heating the spring device 602, so that the packaging material wrapping the waste products is heat-sealed.

Figure 7:
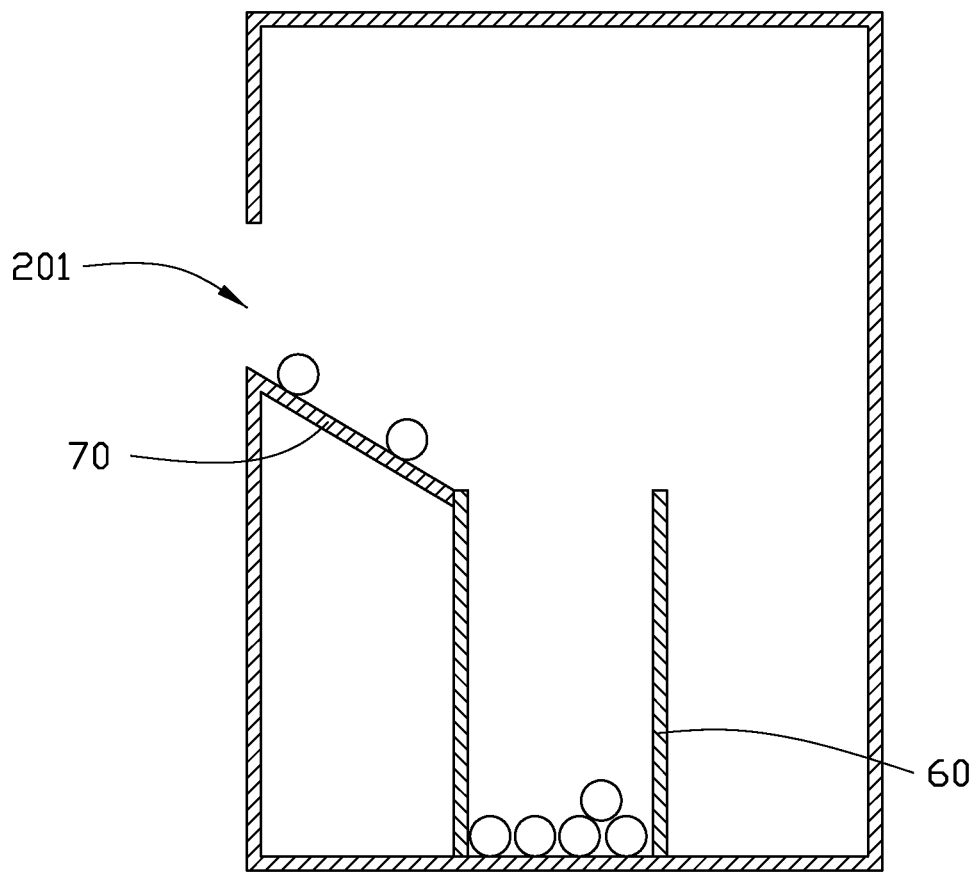
FIG. 7 is a schematic diagram showing an input port and a storage module for depositing non-reimbursable waste products.

In one embodiment, the recycling device 1 further accepts some non-reimbursable waste products. As shown in FIG. 7, the input module 20 further includes an input port 201 dedicated for inputting the non-reimbursable waste products. The recycling device 1 further includes a sliding chute 70. A first end of the sliding chute 70 abuts the input port 201, and a second end of the sliding chute 70 abuts the storage module 60. The non-reimbursable waste products directly slide down the sliding chute 70 to the storage module 60 for storage.

Figure 8:
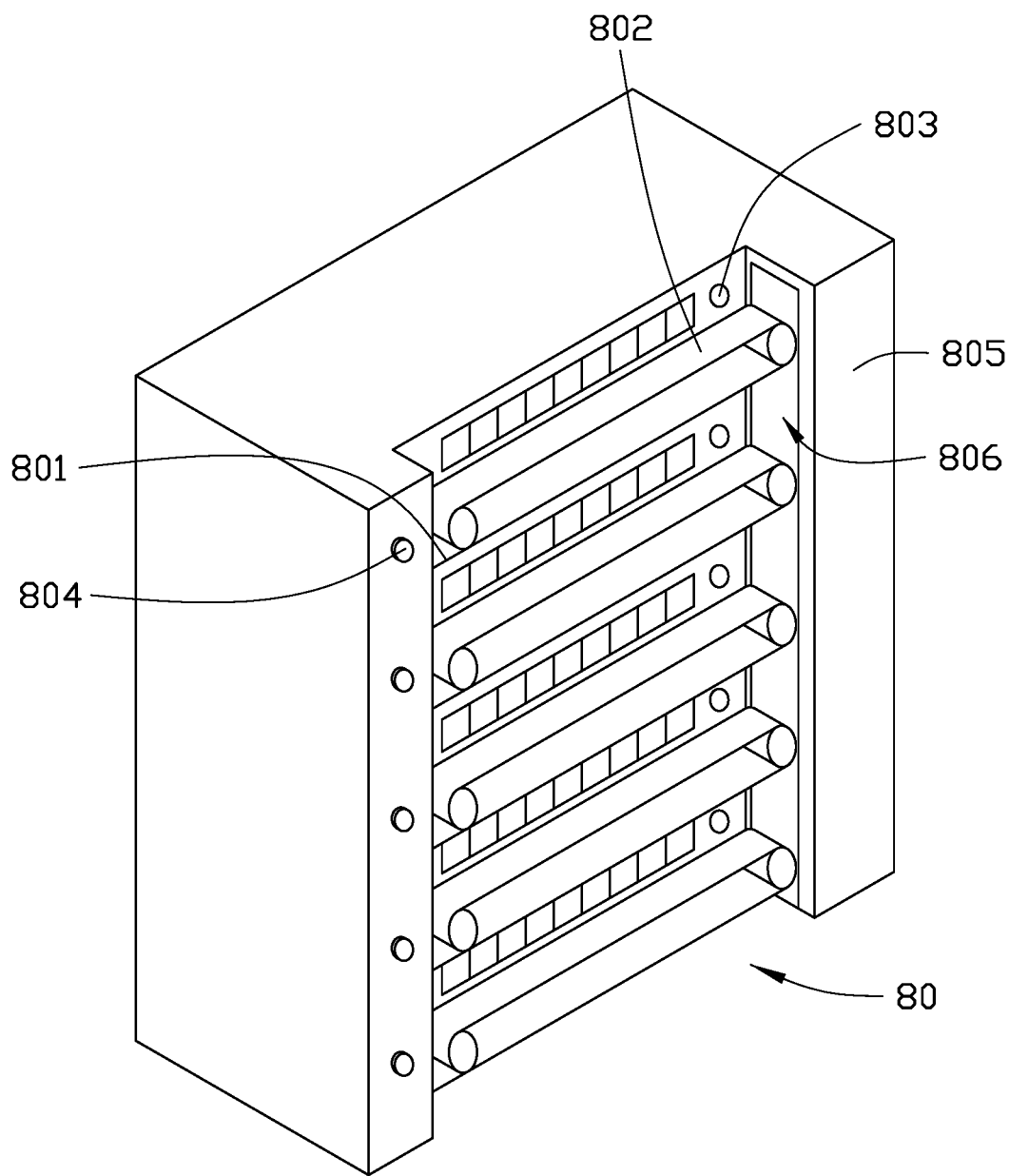
FIG. 8 is a schematic diagram of an embodiment of a retrieving module of the recycling device.

Referring to FIG. 8, the recovery device 1 further includes a retrieving module 80. The retrieving module 80 includes a plurality of shelves 801, a conveyor belt 802, a plurality of sensors 803, a plurality of buttons 804, and a chute 805. Each shelf 801 corresponds to one type of waste product and carries the corresponding storage module 60 storing the packaged waste products. The conveyor belt 802 conveys the storage module 60. Each sensor 803 is mounted on the respective shelf 801 for detecting whether the storage module 60 is present on the shelf 801. Each button 804 is marked with the corresponding type of waste product. Each button 804 is mounted on the main body 10 at a position adjacent to the respective shelf 801. A lower end of the chute 805 is open, and an opening 806 is defined in the chute 805. The opening 806 is aligned with the plurality of shelves 801.

When one of the buttons 804 is pressed, the processor 110 determines whether the sensor 803 detects the storage module 60 on the corresponding shelf 801. When the sensor 803 detects the storage module 60 on the shelf 801, the processor 110 controls the conveyor belt 802 on the shelf 801 to roll toward the chute 805 to drive the storage module 60 on the shelf 801 to move toward the chute 805. When the storage module 60 reaches the end of the shelf 801, the storage module 60 drops through the opening 806 out of the lower end of the chute 805, so that the storage module 60 can be retrieved. When the sensor 803 no longer detects the storage module 60 on the shelf 801, the conveyor belt 802 is controlled to stop rotating.

Further, as shown in FIG. 2, the recycling device 1 further includes a fee calculating module 90 for determining the reimbursement for the type of waste product according to the weight of the deposited waste product. In one embodiment, the memory 120 stores a payment method and unit price of the type of waste product and the weight of the deposited waste product determined by the electromagnetic spring.

In one embodiment, the fee calculating module 90 includes a cash calculating module 901 and a receipt code generation module 902. The main body 10 further defines a cash dispensing outlet 101. The cash calculating module 901 dispenses cash from the cash dispensing outlet 101 according to the determined reimbursement. The receipt code generating module 902 generates a receipt code corresponding to the reimbursement amount, and the receipt code can be scanned by a mobile device to receive the reimbursement amount.

The recycling device 1 further includes a positioning module 91 for positioning the recycling device 1 and transmitting positioning information to the cloud server 2. In one embodiment, the positioning module 91 is a GPS module. An application software installed on a mobile device can log into the waste recycling system 100, and the application software can display positioning information of a plurality of recycling devices 1 on the mobile device in the form of a map to locate a nearest recycling device 1.

The recycling device 1 further includes a prompt module 92 for sending a prompt to the cloud server 2, and then the cloud server 2 can further notify recycling personnel to collect the deposited waste products.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A recycling device comprising:
a main body;
an input module comprising at least one input port for depositing a waste product of one type;
an identification module identifying the deposited waste product and determining whether a type of the deposited waste product matches the corresponding input port;
a detection module detecting components of the deposited waste product and a purity of the deposited waste product according to the components when the type of the deposited waste product matches the corresponding input port; wherein the detection module detects a percentage of the component belonging to the type of the deposited waste product of a total composition of the deposited waste product, determines whether the percentage is greater than or equal to a preset percentage, determines that the purity of the deposited waste product is qualified in response that the percentage is determined to be greater than or equal to the preset percentage, and determines that the purity of the deposited waste product is unqualified if the percentage is determined to be less than the preset percentage;
a packaging module packaging the deposited waste product when the purity of the deposited waste product is qualified; and
a storage module storing the deposited waste product.

2. The recycling device of claim 1, wherein:
the input module comprises a cover, a button, a spring device, and a carrying device;
the cover is disposed corresponding to the at least one input port and covers or opens the input port;
the button is disposed corresponding to the at least one input port on the main body;
when the button is pressed, the spring device is triggered to control the cover to open to allow the waste product to be deposited through the input port; and
the carrying device carries the deposited waste product.

3. The recycling device of claim 2, wherein:
the carrying device comprises a plurality of electromagnetic springs and two carrying portions, each carrying portion coupled to a corresponding number of electromagnetic springs;
the electromagnetic springs weigh the deposited waste product on the carrying portions;
when the purity of the deposited waste product is qualified, the electromagnetic springs drive the carrying portions to rotate downward, so that the waste product falls into the packaging module.

4. The recycling device of claim 1, wherein:
the identification module identifies the type of waste product by machine vision and a plurality of image features of each type of waste product generated by deep learning methods.

5. The recycling device of claim 1, wherein:
the packaging module comprises a first receiving chamber coupled to the input module for receiving the deposited waste product.

6. The recycling device of claim 5, wherein:
the packaging module further comprises a first packaging portion, and a second packaging portion;
the first packaging portion is mounted in the first receiving chamber;
the second packaging portion includes a fixing portion, a driving portion, and two supporting portions;
the two supporting portions are respectively disposed on opposite sidewalls of the main body;
the fixing portion is mounted between the two supporting portions;
when the deposited waste product falls into the first receiving chamber, the driving portion drives the fixing portion to slide along the supporting portions to an opposite end of the supporting portions, so that packaging material wound on the fixing portion adheres to the waste product.

7. The recycling device of claim 5, wherein:
the storage module comprises a second receiving chamber and a spring device;
the second receiving chamber is coupled to the first receiving chamber;
the spring device is disposed at a joint between the first receiving chamber and the second receiving chamber;
the second receiving chamber receives the waste product fallen through the spring device from the first receiving chamber.

8. The recycling device of claim 7, wherein:
the spring device comprises two resilient panels, two springs, and two fixing rods;
the two resilient panels carry the packaged waste products in the first receiving chamber;
the two fixing rods are disposed on the two resilient panels, respectively;
the two springs are sleeved on the two fixing rods, respectively;
when a weight of the packaged waste products exceeds a preset weight-bearing capacity of the resilient panels, the packaged waste products rotate the resilient panels downward and fall through the two resilient panels into the second receiving chamber.

9. The recycling device of claim 1, further comprising a retrieving module, wherein:
the retrieving module comprises a plurality of shelves, a plurality of conveyor belts, a plurality of sensors, a plurality of buttons, and a chute;
each of the plurality of shelves corresponds to one type of waste product and carries the storage module receiving the packaged waste products;
each conveyor belt is disposed corresponding to the respective shelf and rolls to transport the respective storage module;
each sensor is disposed on the respective shelf and detects whether the storage module is on the shelf;
each button indicates the type of waste product and is disposed on the respective shelf;
the chute defines an opening aligned with an end of each of the plurality of shelves;
when one of the buttons is pressed and the sensor detects that the storage module is on the shelf, the conveyor belt of the respective shelf rolls to transport the storage module to the end of the shelf until the storage module enters the opening and drops through the chute.

10. The recycling device of claim 1, further comprising a fee calculating module for calculating a reimbursement amount of the deposited waste products according to the type and weight of the deposited waste products.

11. A recycling device comprising:
a main body;
an input module disposed on the main body and comprising a plurality of input ports, each input port corresponding to one type of waste product for depositing the waste product through the input port;
an identification module disposed in the main body for identifying the deposited waste product and determining whether the type of the deposited waste product matches the corresponding input port through which the waste product was deposited;
a detection module disposed in the main body for detecting components of the deposited waste product and a purity of the deposited waste product according to the components when the type of the deposited waste product matches the corresponding input port; wherein the detection module detects a percentage of the component belonging to the type of the deposited waste product of a total composition of the deposited waste product, determines whether the percentage is greater than or equal to a preset percentage, determines that the purity of the deposited waste product is qualified in response that the percentage is determined to be greater than or equal to the preset percentage, and determines that the purity of the deposited waste product is unqualified if the percentage is determined to be less than the preset percentage;
a plurality of packaging modules disposed in the main body, each of the plurality of packaging modules packaging one type of waste product when the purity of the deposited waste product is qualified; and
a plurality of storage modules disposed in the main body, each of the plurality of storage modules storing one type of waste product.

* * * * *